(12) United States Patent
Müller-Fischer et al.

(10) Patent No.: US 8,886,501 B2
(45) Date of Patent: Nov. 11, 2014

(54) METHOD OF SIMULATING DEFORMABLE OBJECT USING GEOMETRICALLY MOTIVATED MODEL

(75) Inventors: Matthias Müller-Fischer, Männedorf (CH); Bruno Heidelberger, Zürich (CH); Matthias Teschner, Freiburg (DE); Markus Gross, Uster (CH)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/471,361

(22) Filed: May 14, 2012

(65) Prior Publication Data

US 2012/0218271 A1    Aug. 30, 2012

Related U.S. Application Data

(62) Division of application No. 12/642,193, filed on Dec. 18, 2009, now Pat. No. 8,190,412, which is a division of application No. 11/346,299, filed on Feb. 3, 2006, now Pat. No. 7,650,266.

(60) Provisional application No. 60/678,815, filed on May 9, 2005.

(51) Int. Cl.
*G06F 17/50* (2006.01)
*G06T 17/00* (2006.01)
*G06T 17/20* (2006.01)
*G06F 11/26* (2006.01)
*G06F 13/10* (2006.01)

(52) U.S. Cl.
CPC ............ *G06F 17/5009* (2013.01); *G06T 17/00* (2013.01); *G06T 17/20* (2013.01); *G06F 11/261* (2013.01); *G06F 17/50* (2013.01); *G06F 13/105* (2013.01); *G06F 2217/16* (2013.01)
USPC .............................. 703/6; 703/1; 703/2; 703/7

(58) Field of Classification Search
CPC ...... G06F 9/5077; G06F 11/261; G06F 17/50
See application file for complete search history.

(56) References Cited

U.S. PATENT DOCUMENTS

| 5,796,400 | A | * | 8/1998 | Atkinson et al. | 345/420 |
| 5,818,452 | A | * | 10/1998 | Atkinson et al. | 345/420 |
| 5,892,691 | A | * | 4/1999 | Fowler | 703/6 |
| 6,147,692 | A | * | 11/2000 | Shaw et al. | 345/643 |
| 6,236,403 | B1 | * | 5/2001 | Chaki et al. | 345/420 |
| 6,504,541 | B1 | * | 1/2003 | Liu et al. | 345/619 |
| 6,525,735 | B1 | * | 2/2003 | Maillot | 345/473 |

(Continued)

OTHER PUBLICATIONS

Duncan et al. "Physical and Geometrical Modeling for Image-Based Recovery of Left Ventricular Deformation", Progress in Biophysics and Molecular Biology, 69(2-3):333-351, 1998.*

(Continued)

*Primary Examiner* — Shambhavi Patel
*Assistant Examiner* — Bernard E Cothran
(74) *Attorney, Agent, or Firm* — Patterson & Sheridan, LLP

(57) ABSTRACT

A method of stimulating a deformable object comprises modeling deformable elasticity for the object by defining an actual shape and a goal shape and pulling points in the goal shape towards corresponding points in the goal shape.

18 Claims, 4 Drawing Sheets

(56) References Cited

U.S. PATENT DOCUMENTS

| | | | |
|---|---|---|---|
| 6,556,196 B1* | 4/2003 | Blanz et al. | 345/419 |
| 6,608,631 B1* | 8/2003 | Milliron | 345/647 |
| 6,862,026 B2* | 3/2005 | Zachmann | 345/474 |
| 6,876,364 B2* | 4/2005 | Buddemeier et al. | 345/473 |
| 6,967,658 B2* | 11/2005 | Hunter et al. | 345/473 |
| 7,050,655 B2* | 5/2006 | Ho et al. | 382/285 |
| 7,077,647 B2* | 7/2006 | Choi et al. | 433/24 |
| 7,156,661 B2* | 1/2007 | Choi et al. | 433/213 |
| 7,212,203 B2* | 5/2007 | Payne | 345/420 |
| 7,236,170 B2* | 6/2007 | Sepulveda | 345/423 |
| 7,286,972 B2* | 10/2007 | Maker | 703/7 |
| 7,363,198 B2* | 4/2008 | Balaniuk et al. | 703/2 |
| 7,363,199 B2* | 4/2008 | Reynolds et al. | 703/2 |
| 7,392,163 B1 | 6/2008 | Bindeman | 703/2 |
| 2003/0088389 A1* | 5/2003 | Balaniuk et al. | 703/2 |
| 2003/0179205 A1* | 9/2003 | Smith et al. | 345/474 |
| 2004/0037474 A1* | 2/2004 | Happel | 382/280 |
| 2004/0236457 A1* | 11/2004 | Stabelfeldt et al. | 700/132 |
| 2008/0071507 A1* | 3/2008 | Hodgins et al. | 703/6 |

OTHER PUBLICATIONS

Muller et al. "Stable Deformations using Stiffness Warping", 2002.*

Cotin, et al. "A Hybrid Elastic Model Allowing Real-Time Cutting Deformations and Force-Feedback for Surgery Training and Simulation", Visual Computer Journal, vol. 16, No. 8, pp. 437-452, 2000.*

Peckar et al. "Two-Step Parameter-Free Elastic Image Registration with Prescribed Point Displacements", Lecture Notes in Computer Science, 1997, Issue 1310, pp. 527-534.*

Bridson et al. "Simulation of Clothing with Folds and Wrinkles", Eurographics/SIGGRAPH Symposium on Computer Animation (2003).*

Santhanam et al. "Physically-based deformation of high-resolution 3D models for Augmented Reality based medical visualization", 2004.*

Muller et al. "Real-Time Simulation of Deformation and Fracture of Stiff Materials", 2003.*

Teschner, et al. "A Versatile and Robust Model for Geometrically Complex Deformable Solids", 2004.*

Milliron, et al. "A Framework for Geometric Warps and Deformation", ACM Transactions on Graphics, vol. 21, No. 1, Jan. 2002, pp. 20-51.*

David Breen and Ross Whitaker, "A Level-Set Approach for the Metamorphosis of Solid Models," IEEE Transactions on Visualization and Computer Graphics, vol. 7, No. 2, pp. 173-192, Apr.-Jun. 2001.*

* cited by examiner

METHOD OF SIMULATING DEFORMABLE OBJECT USING GEOMETRICALLY MOTIVATED MODEL

CROSS-REFERENCE TO RELATED APPLICATIONS

This application is a divisional of the U.S. patent application, filed Dec. 18, 2009, having Ser. No. 12/642,193 which Issued May 29, 2012, having U.S. Pat. No. 8,190,412 which is a divisional application of the U.S. patent application, filed Feb. 3, 2006, having Ser. No. 11/346,299 which Issued Jan. 19, 2010, having U.S. Pat. No. 7,650,266 which claims benefit of United States provisional application filed May 9, 2005 having a Ser. No. 60/678,815. Each of the aforementioned related patent applications is herein incorporated by reference.

BACKGROUND OF THE INVENTION

1. Field of the Invention

Embodiments of the present invention relate generally to methods of simulating deformable objects. More particularly, embodiments of the invention relate to methods of simulating deformable objects using a geometrically motivated underlying model.

2. Description of Related Art

Realistic computer simulations of everyday objects such as clothing, plastics, elastic materials, and articulated joints can be extremely difficult to generate due to the complex ways in which these objects tend to deform in real life. Simulations of such "deformable objects" must generally take into account both complicated geometric features and material properties of the objects.

One common technique used to simulate deformable objects first creates a virtual model of an object (e.g., a mesh or point cloud) and then applies simulated physical forces such as tension, friction, gravity, pressure, etc., to the discrete points of the virtual model. Such virtual models have been used to represent a wide variety of materials under different conditions. For example, researchers have developed virtual models for clothing, plastic, rubber, and so on. In addition, researchers have also developed virtual models to simulate complex, unique behaviors of these objects, such as fracturing and melting.

Some of the more common approaches to simulating deformable objects involve finite difference methods, mass-spring systems, boundary element methods, finite element methods, and implicit surfaces and mesh-free particle systems.

Despite the number of methods that have been developed for simulating deformable objects, such methods are rarely incorporated into applications like computer games. For example, a few contemporary games incorporate cloth models with simple geometries; however, in general, most applications running on Personal Computers (PCs) or game consoles tend to model only rigid bodies or objects. Indeed, multiple rigid objects are sometimes combined to imitate the movement of a deformable object, but true deformable object simulations are rare.

One reason why deformable object simulations are rarely used in an application such as computer games is that stable simulations are generally too inefficient to satisfy the real-time demands of the application. For instance, conventional simulation methods often rely on implicit numerical integration to update the locations of discrete points in a virtual model. Implicit numerical integration techniques can provide a stable simulation, but they are too computationally expensive to process large and complicated physical models in realtime. Other physical modeling approaches rely on explicit numerical integration, which is more efficient, but it cannot guarantee a stable simulation.

The term "stability" here refers to a process's tendency to respond in a reasonable way to minor deviations in its inputs. For instance, implicit numerical integration techniques produce accurate simulations as various input parameters are varied, such as the mass of simulated points, the timestep of the integration, and so on. In contrast, explicit numerical integration techniques may produce simulations where the overall energy of a system erroneously increases by simply varying the timestep of the integration, the mass of simulated points, or the stiffness of a simulated object. As a result, explicit numerical integration techniques can produce highly unrealistic simulation results.

Various approaches have been developed to improve the efficiency of stable simulation techniques. For example, robust integration schemes with large timesteps and multi-resolution models have been developed. In addition, modal analysis approaches, which trade accuracy for efficiency, have also been developed. Furthermore, methods incorporating pre-computed state space dynamics and precomputed impulse response functions have also been used to improve the efficiency of simulations. Finally, dynamic models derived from global geometric deformations of solid primitives such as spheres, cylinders, cones, or super quadrics have also been introduced to improve the efficiency of stable simulation techniques.

FIG. 1 is a diagram illustrating one way in which instability arises in deformable object simulations using explicit numerical integration. In FIG. 1, a simple one dimensional deformable object is modeled as a mass-spring system. Like many physically motivated deformable object simulations, the mass-spring system relies on Newton's second law of motion. According to Newton's second law of motion, the acceleration of an object produced by a net force is directly proportional to the magnitude of the net force in the direction of the net force, and inversely proportional to the mass of the object. In deformable objects, at least part of the net force at any point is created by displacement of the point from an equilibrium position. The displacement of a point from its equilibrium position creates potential energy, i.e., "deformation energy", causing the point to be pulled toward the equilibrium position.

Referring to FIG. 1A, a mass-spring system 100 comprises a spring 101 with a resting length $l_0$, and two point masses 102 and 103 both having mass "m". Point mass 102 is fixed at an origin and point mass 103 is located at x(t) at an initial time "t". At initial time "t", the amount of force on point mass 103 is defined by the spring equation $f=-k(x(t)-l_0)$, where "k" is the spring constant, or "stiffness", of spring 101. Conceptually, the spring equation indicates that point mass 103 is pulled toward an equilibrium position where $x=l_0$.

The location of point mass 103 is updated by a modified Euler integration scheme after a timestep "h". According to the modified Euler integration scheme, the velocity "v" and position "x" of point mass 103 at time "t+h" are computed using the following equations (1) and (2):

$$v(t+h) = v(t) + h\frac{-k(x(t)-l_0)}{m} \quad (1)$$

$$x(t+h) = x(t) + hv(t+h) \quad (2)$$

Equation (1) uses an explicit Euler step and equation (2) uses an implicit Euler step.

Equations (1) and (2) can be represented as a system matrix "M" multiplied by a state vector $[v(t),x(t)]^T$, i.e., $$\begin{bmatrix} v(t+h) \\ x(t+h) \end{bmatrix} = \begin{bmatrix} v(t) \\ x(t) \end{bmatrix} + \frac{1}{m} \begin{bmatrix} kl_0 h^2 \\ kl_0 h \end{bmatrix},$$

where system matrix "E" is defined by the following equation (3):

$$E = \begin{bmatrix} 1 & -\frac{kh}{m} \\ h & 1 - \frac{h^2 k}{m} \end{bmatrix} \quad (3)$$

System matrix "E" has eigenvalues $e_0$ and $e_1$ represented by the following equations (4) and (5):

$$e_0 = 1 - \frac{1}{2m}\left(h^2 k - \sqrt{-4mh^2 k + h^4 k^2}\right) \quad (4)$$

$$e_1 = 1 - \frac{1}{2m}\left(h^2 k + \sqrt{-4mh^2 k + h^4 k^2}\right) \quad (5)$$

Since system matrix "E" represents a discrete system, the spectral radius of system matrix "E", i.e., the maximum magnitude of eigenvalues $e_0$ and $e_1$, must not be larger than one (1) to ensure stability of the discrete system. The magnitude of eigenvalue $e_0$ converges to 1 with $|e_0|<1$ for $h^2 k \to \infty$. However, the magnitude of $e_1$ is only smaller than one where timestep "h" is less than $$2\sqrt{\frac{m}{k}}.$$

Where timestep "h" is greater than $$2\sqrt{\frac{m}{k}},$$

the system is unstable. Accordingly, the integration scheme involving equations (1) and (2) is only conditionally stable.

To further illustrate the instability of the discrete system represented by system matrix "E", FIG. 1B shows the result of performing an integration step starting with $v(t)=0$. The integration step moves point mass 103 by a distance $$\Delta x = -\frac{h^2 k}{m}(x(t) - l_0).$$

Where timestep "h" or stiffness "k" are too large or mass "m" is too small, point mass 103 overshoots equilibrium position $l_0$, by a distance greater than the distance between $x(t)$ and $l_0$. In other words, $|x(t+h)-l_0|>|x(t)-l_0|$. As a result, the potential energy of system 100 increases after timestep "h". Since system 100 had zero kinetic energy at time "t", the overall (i.e., kinetic plus potential) energy of the system is erroneously increased after timestep "h".

In general, the stability problem of explicit integration schemes can be stated as follows: elastic forces are negative gradients of elastic energy. As such, elastic forces point towards equilibrium positions. Explicit schemes may inaccurately scale the elastic forces when computing the displacements of points, causing the points to overshoot equilibrium positions so much that they increase the deformation and the energy of the system instead of preserving or decreasing the deformation energy, which is required for stability.

One way to address the overshoot problem is to limit the displacement of points such that they never overshoot their respective equilibrium positions. For instance, in the one-dimensional spring example of FIG. 1, the movement of point mass 103 could be restricted from passing the equilibrium position $x=l_0$. One problem with this approach is that for many types of physical models, equilibrium positions are not readily defined for all points. For example, it is difficult to define equilibrium positions in solid finite elements or geometrically complex meshes.

SUMMARY OF THE INVENTION

According to one embodiment of the invention, a method of modeling a deformable object comprises modeling deformable elasticity for the object by pulling a deformed shape towards a defined goal shape.

According to another embodiment of the invention, a method of simulating a deformable object comprises defining positions and velocities for a plurality of points in a deformed shape, and updating the positions and velocities according to the positions of points in a goal shape.

According to still another embodiment of the invention, a method of describing object deformation in a simulation comprises defining elastic forces associated with the object deformation in proportion to distances between points in a deformed shape and points in a goal shape, resolving the object deformation toward an equilibrium using an explicit integration scheme, and resolving the explicit integration scheme by matching on a point by point basis an original shape and the deformed shape and then pulling points corresponding to the deformed shape towards a corresponding points in the goal shape.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Figure 1A:
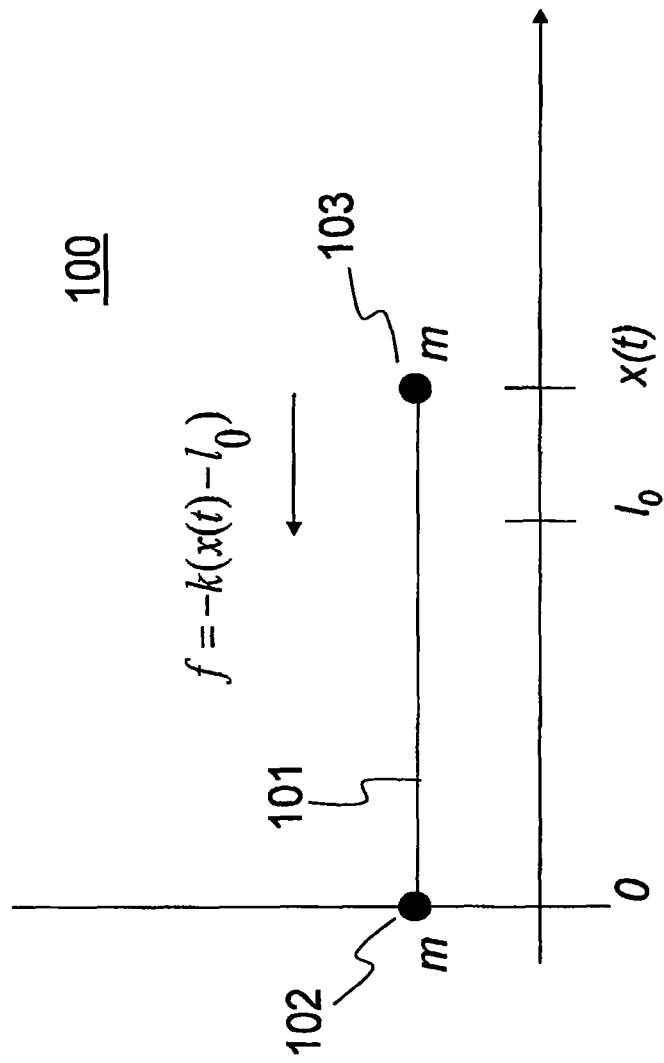
FIGS. 1A and 1B are diagrams of a conventional one dimensional mass-spring system used to simulate a deformable object.

Embodiments of the present invention provide various methods of modeling and simulating deformable objects. These methods can be readily applied to a wide range of computer-related applications such as scientific visualization, computer graphics, computer animated films, and video games, to name but a few.

Selected embodiments of the invention are particularly well-suited for applications requiring a high level of computational efficiency. For instance, some embodiments of the invention are capable of performing real-time simulations on deformable objects with complicated geometries and/or material properties using only a small portion of a computer's data processing bandwidth.

Video games are one application that requires a high level of computational efficiency. For example, state-of-the-art video games tend to incorporate a variety of realistic effects, such as characters and objects that interact with their environment in real time as if governed by the laws of physics. Such characters and objects are often formed by deformable objects including, for example, clothing, bendable or stretchable materials, and so on.

A deformable object simulation according to embodiments of the invention is typically performed by running a software application on a computational platform including at least one microprocessor and memory. The term "run" here describes any process in which a hardware resource associated with a computational platform performs an operation under the direction (directly or indirectly) of a software resource.

To simulate a deformable object, the software application receives geometric data and physics data defining a configuration of the deformable object and any external forces acting on the object. The "configuration" of a deformable object is broadly defined as a description of all physical attributes of the object itself, including, for example, the locations and masses of discrete elements constituting the object (e.g., points, surfaces, etc.), any connectivity and movement of those discrete elements, and so forth.

The software application simulates the deformable object by updating the object's configuration based on internal forces of the object such as elastic tension, the movement of discrete elements comprising the object, and any external forces acting on the object such as gravity, pressure, or friction, or impact forces from collisions with other objects.

The computational platform typically comprises one or more central processing units (CPUs) and one or more memories. The one or more memories store the software application and loads it into the one or more CPUs for execution.

A deformable object simulation may also be performed with more than one software application. For example, the simulation could be performed by two software applications running in two execution threads on a single CPU, on two different processor cores, or two different CPUs. Where the simulation is performed by two software applications, one of the applications generally comprises a main application defining the geometric and physics data, and the other application generally comprises a physics application running in parallel with the main application and updating the geometric and physics data.

Various computational platforms capable of performing such a simulation are disclosed, for example, in U.S. patent application Ser. Nos. 10/715,459 and 10/715,440 filed Nov. 19, 2003, Ser. No. 10/815,721 filed Apr. 2, 2004, Ser. No. 10/839,155 filed May 6, 2004, Ser. No. 10/982,791 filed Nov. 8, 2004, and Ser. No. 10/988,588 filed Nov. 16, 2004. The subject matter of these commonly-assigned, co-pending patent applications is hereby incorporated by reference.

In this description, the term "deformable object" refers broadly to any collection of data capable of representing an object comprising elements that can be arranged with varying spatial relationships. For example, a deformable object could comprise a mesh, a surface, or a set of points. A deformable object generally further comprises parameters related to the way the object tends to deform. For example, the deformable object may comprise a goal state for each of its elements, and a stiffness parameter specifying how easily each element approaches its goal state.

Figure 2:
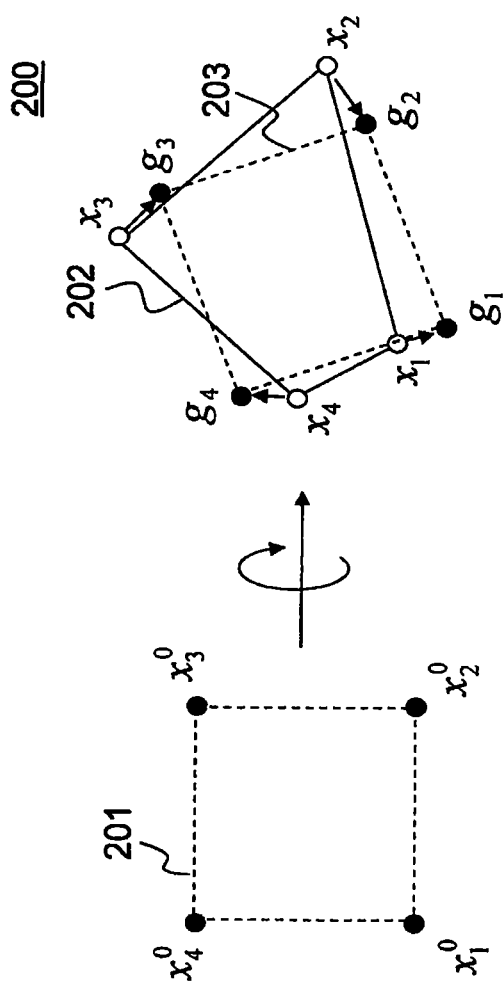
FIG. 2 is a diagram illustrating a simulation of a two dimensional deformable object according to one embodiment of the present invention; and, FIG. 3 is a flowchart illustrating a method of simulating a deformable object according to an embodiment of the present invention.

FIG. 2 is a diagram illustrating a method of modeling and simulating a deformable object according to one embodiment of the invention. For simplicity of explanation, the method of FIG. 2 is described in relation to a two-dimensional (2D) object. However, the method can be readily applied to objects expressed in higher (e.g., 3D) or lower (e.g., 1D) dimensions.

Referring to FIG. 2, a deformable object 200 is modeled by an "actual shape" 202 corresponding to a deformed state of deformable object 200, and a "goal shape" 203 corresponding to a non-deformed state of deformable object 200. Actual shape 202 comprises four "actual points" $x_1$, $x_2$, $x_3$, and $x_4$, and goal shape 203 comprises four "goal points" $g_1$, $g_2$, $g_3$, and $g_4$ corresponding to respective actual points $x_1$, $x_2$, $x_3$, and $x_4$. Actual points $x_1$, $x_2$, $x_3$, and $x_4$, are characterized by respective masses "$m_1$", "$m_2$", "$m_3$", and "$m_4$".

Goal shape 203 is defined by matching an "original shape" 201 comprising four "original points" $x_1^0$, $x_2^0$, $x_3^0$, and $x_4^0$ to corresponding actual points $x_1$, $x_2$, $x_3$, and $x_4$ in actual shape 202. In other words, goal shape 203 is a matched version of original shape 201. The term "match" here refers to a process of transformation applied to original shape 201 such that goal shape 203 will approximate actual shape 202. As will be explained, such a transformation can comprise, for example, a linear transformation, a higher order (e.g., quadratic) transformation, or some combination thereof. Once goal shape 203 is defined, deformable elasticity in deformable object 200 is then modeled by pulling actual points $x_1$, $x_2$, $x_3$, and $x_4$ toward corresponding goal points $g_1$, $g_2$, $g_3$, and $g_4$, as indicated by arrows in FIG. 2.

In this written description, the notations $x_1^0$, $x_i$, and $g_i$ are used to refer to points and also to locations of the points. For example, the location of an actual point $x_i$ is denoted as simply $x_i$.

One way to match original shape 201 to actual shape 202 is by rotating and translating original shape 201. The amount of rotation and translation can be determined by minimizing some distance between points in goal shape 203 and corresponding points in actual shape 202. For example, the translation and rotation could be chosen to minimize a weighted least squares distance between corresponding points in goal shape 203 and actual shape 202.

Correspondences between points in original shape 201 and actual shape 202 are generally defined a priori, for example, when original shape 201 and actual shape 202 are first defined.

In FIG. 2, corresponding points are labeled with the like subscripts. For example, original point $x_1^0$ corresponds to actual and goal points $x_1$ and $g_1$. Accordingly, the configuration of goal shape 203 can be computed by finding a rotation matrix R and translation vectors $t_0$ and t such that the following equation (5) is minimized:

$$\sum_i w_i (R(x_i^0 - t_0) + t - x_i)^2 \qquad (5)$$

In equation (5), $w_i$ represents a mathematical weight associated with original and actual points $x_i^0$ and $x_i$. Typically, the weight assigned to each point is the point's mass. Accordingly, to simplify this written description, weights $w_i$ are substituted by masses "$m_i$" throughout.

Where the mathematical weight $w_i$ of each point in deformable object 200 is the point's mass "$m_i$", translation vectors $t_0$ and $t$ are defined as respective centers of mass $x_{cm}^0$ and $x_{cm}$ of original shape 201 and actual shape 202, defined by the following equations (6) and (7):

$$t_0 = x_{cm}^0 = \frac{\sum_i m_i x_i^0}{\sum_i m_i} \quad (6)$$

$$t = x_{cm} = \frac{\sum_i m_i x_i}{\sum_i m_i}. \quad (7)$$

To compute rotation matrix R, relative locations $q_i$ and $p_i$ of the points in original shape 201 and actual shape 202 are defined as $q_i = x_i^0 - x_{cm}^0$ and $p_i = x_i - x_{cm}$. A linear transformation matrix "A" minimizing the following equation (8) is then computed:

$$\Sigma_i m_i (Aq_i - p_i)^2. \quad (8)$$

The linear transformation matrix "A" that minimizes equation (8) is computed by taking the derivative of equation (8) with respect to "A" and setting the derivative to zero. The resulting linear transformation matrix "A" is computed by the following equation (9):

$$A = \left(\sum_i m_i p_i q_i^T\right)\left(\sum_i m_i q_i q_i^T\right)^{-1} = A_{pq} A_{qq}. \quad (9)$$

Equation (9) defines a first matrix $A_{qq}$, and a second matrix $A_{pq}$. First matrix $A_{qq}$ is symmetric, and therefore it contains a scaling component, but no rotational component. In contrast, second matrix $A_{pq}$ contains both a symmetric component and a rotational component. The rotational component of second matrix $A_{pq}$ is rotation matrix R and the symmetric component of second matrix $A_{pq}$ is a symmetric matrix S. Rotation matrix R and symmetric matrix S can be found by decomposing second matrix $A_{pq}$ a via polar decomposition, represented by $A_{pq}$=RS. In the polar decomposition, symmetric matrix S is computed as $S=\sqrt{A_{pq}^T A_{pq}}$ and rotation matrix R is computed as $R=A_{pq}S^{-1}$. Once rotation matrix R is defined, the locations of goal points $g_1, g_2, g_3$, and $g_4$ are computed by the following equation (10):

$$g_i = R(x_i^0 - x_{cm}^0) + x_{cm}. \quad (10)$$

Then, upon computing the locations of goal points $g_1, g_2, g_3$, and $g_4$, the locations of actual points $x_1, x_2, x_3$, and $x_4$ are updated by integration according to the following equations (11) and (12):

$$v_i(t+h) = v_i(t) + \alpha \frac{g_i(t) - x_i(t)}{h} + h f_{ext\_i}(t)/m_i \quad (11)$$

$$x_i(t+h) = x_i(t) + h v_i(t+h) \quad (12)$$

In equations (11) and (12), the term $\alpha$ represents a "stiffness" of deformable object 200. The term $\alpha$ ranges from zero to one, where a value of $\alpha=1$ indicates that deformable object 200 is rigid, and a value of $\alpha=0$ indicates that deformable object 200 is highly deformable. The term $f_{ext\_i}(t)$ denotes a net external force acting on point "i" of actual shape 202 at time t.

To illustrate the effect of $\alpha$ on actual shape 202, suppose that $\alpha=1$, initial velocity $v(t)=0$, and net external force $f_{ext\_i}(t)=0$. Under these conditions equation (11) evaluates as $$v_i(t+h) = \alpha \frac{g_i(t) - x_i(t)}{h},$$

and equation (12) becomes $x_i(t+h) = x_i(t) + g_i(t) - x_i(t) = g_i(t)$. In other words, if deformable object 200 is rigid, deformable shape 202 tends to approach the configuration of goal shape 203 very quickly. Where $\alpha<1$, deformable shape 202 still approaches the configuration of goal shape 203, however, it does so more slowly.

Figure 1B:
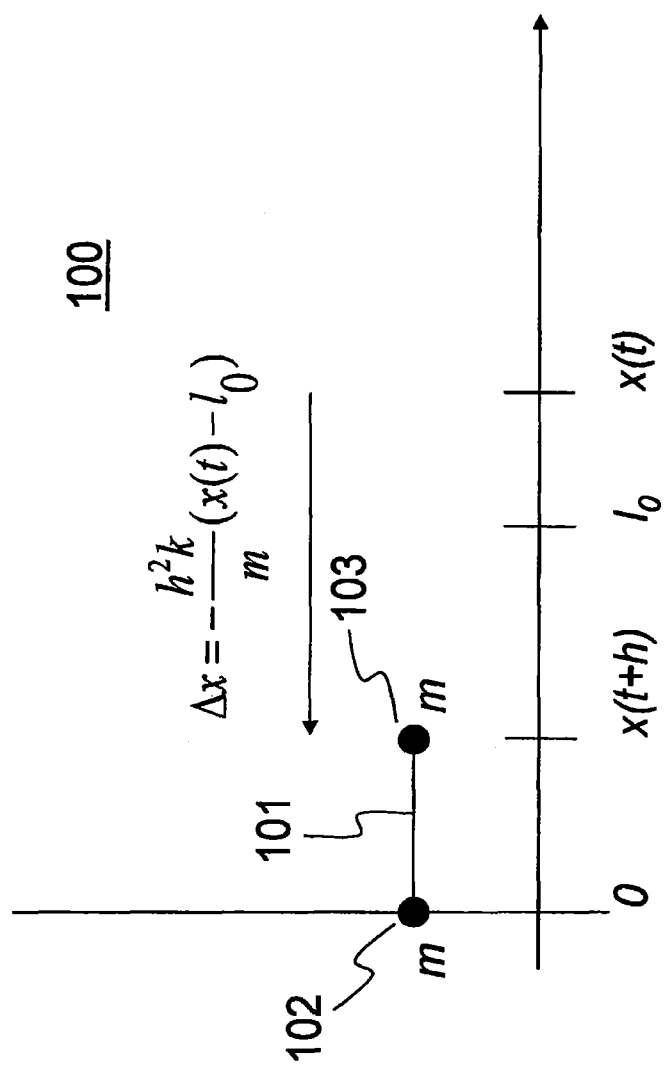

Applying equations (11) and (12) to mass-spring system 100 shown in FIG. 1, the velocity and position of point mass 103 are updated according to the following equation (13):

$$\begin{bmatrix} v(t+h) \\ x(t+h) \end{bmatrix} = \begin{bmatrix} 1 & -\alpha/h \\ h & 1-\alpha \end{bmatrix} \begin{bmatrix} v(t) \\ x(t) \end{bmatrix} + \begin{bmatrix} \alpha l_0/h \\ \alpha l_0 \end{bmatrix}. \quad (13)$$

In equation (13), the term $$\begin{bmatrix} 1 & -\alpha/h \\ h & 1-\alpha \end{bmatrix}$$

represents a system matrix similar to system matrix "E" in equation (3). However, unlike the eigenvalues of system matrix "E", the magnitudes of the eigenvalues of the term $$\begin{bmatrix} 1 & -\alpha/h \\ h & 1-\alpha \end{bmatrix}$$

are always one (1), regardless of the respective values of $\alpha$ and timestep h. IN particular, the eigenvalues of the term $$\begin{bmatrix} 1 & -\alpha/h \\ h & 1-\alpha \end{bmatrix}$$

are defined as $(1-\alpha/2) \pm \sqrt{\alpha^2 - 4\alpha}/2$. Because the eigenvalues of the term $$\begin{bmatrix} 1 & -\alpha/h \\ h & 1-\alpha \end{bmatrix}$$

are always equal to one, a simulation of mass-spring system 100 using equations (11) and (12) is unconditionally stable. Moreover, the simulation using equations (11) and (12) does not introduce damping into mass-spring system 100.

A three dimensional simulation of a deformable object with no external forces is also unconditionally stable and free of damping under equations (11) and (12). Moreover, as long as the external forces applied to a deformable object are invariant with respect to location, e.g., forces such as gravity, or the external forces are applied instantaneously, e.g., collision response forces, the simulation will be also be unconditionally stable.

Figure 3:
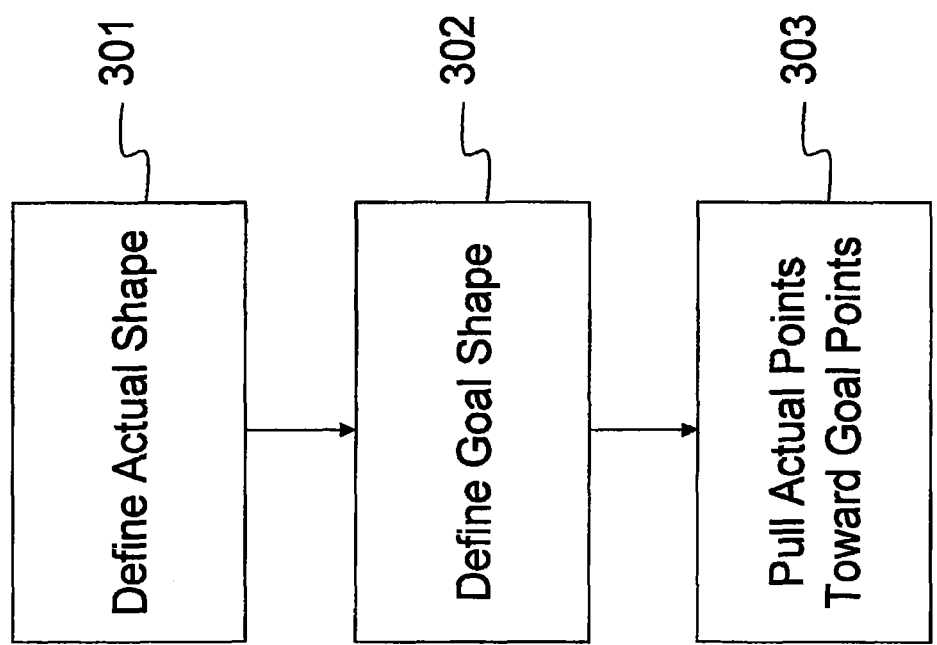

FIG. 3 is a flowchart illustrating a method of simulating a deformable object according to an embodiment of the invention. In the description that follows, exemplary method steps are denoted by parentheses (XXX).

Referring to FIG. 3, the method comprises defining an actual shape corresponding to a deformed state of the deformable object (301), defining a goal shape corresponding to a non-deformed state of the deformable object (302), and updating the location of each point in the actual shape by pulling the point toward a corresponding point in the goal shape (303).

Positions of actual points in the actual shape are generally defined by events in a software application, such as initialization and subsequent updates of the actual shape's configuration. Meanwhile, positions of goal points in the goal shape can be computed in a variety of different ways.

According to one embodiment of the present invention, the positions of goal points $g_i$ in the goal shape are computed by defining an original shape comprising original points and rotating and translating the original shape to match the actual shape using a translation vector and rotation matrix, e.g., as described by equation (10).

The translation vector is generally computed from the respective centers of mass of the original and actual shapes, as described by equations (6) and (7), and the rotation matrix is generally computed by polar decomposition of a linear transformation matrix computed according to equation (9).

In general, center of mass $x_{cm}^0$ in equation (10) and relative locations $q_i$ in equations (8) and (9) are computed before any timesteps of the simulation are executed. Then, at each timestep of the simulation, second matrix $A_{pq} = \Sigma_i m_i p_i q_i^T$ is assembled. Where the deformable object being simulated is three dimensional, second matrix $A_{pq}$ is a 3×3 matrix.

Second matrix $A_{pq}$ is decomposed into rotation matrix "R" and symmetric matrix "S" by computing symmetric matrix S as $S = \sqrt{A_{pq}^T A_{pq}}$ and rotation matrix R as $R = A_{pq} S^{-1}$. The term $S^{-1}$, i.e., $(\sqrt{A_{pq}^T A_{pq}})^{-1}$, is computed by diagonalizing the symmetric matrix $A_{pq}^T A_{pq}$ using 5-10 Jacobi rotations, where the computational complexity of each Jacobi rotation is constant.

According to another embodiment of the invention, the positions of goal points $g_i$ are computed by a linear transformation using rotation matrix "R" and linear transformation matrix "A" according to the following equation (14):

$$g_i = \left(\beta \frac{A}{\sqrt[3]{\det(A)}} + (1-\beta)R\right)(x_i^0 - x_{cm}^0) + x_{cm} \quad (14)$$

In equation (14), the term $\beta$ is a control parameter used to control the locations of goal points $g_i$. Linear transformation matrix "A" is divided by $\sqrt[3]{\det(A)}$ to ensure that the volume of the goal shape relative to the original shape is conserved by equation (14). Linear transformation matrix "A", is generally constructed by forming first matrix $A_{qq}$ before any simulation timesteps are executed and then forming second matrix $A_{pq}$ with each timestep.

One advantage of using equation (14) to compute the positions of goal points g rather than equation (10) is that equation (14) can generate goal points $g_i$ closer the locations of actual points $x_i$. Accordingly, equation (14) is generally better at simulating more highly deformed, and/or less rigid objects.

Another way to compute goal points $g_i$ is by performing a quadratic transformation on the original points. For example, goal points $g_i$ can be computed by a quadratic transformation defined by the following equation (15):

$$g_i = [AQM]\tilde{q}_i. \quad (15)$$

In equation (15), $g_i \in R^3$ and $\tilde{q} = [q_x, q_y, q_z, q_x^2, q_y^2, q_z^2, q_x q_y q_z, q_z q_x]^T \in R^9$. $A \in R^{3 \times 3}$ contains the coefficients for the linear terms $q_x$, $q_y$, $q_z$, $Q \in R^{3 \times 3}$ contains the coefficients for the purely quadratic terms $q_x^2$, $q_y^2$, $q_z^2$, and $M \in R^{3 \times 3}$ contains the coefficients for the mixed terms $q_x q_y$, $q_y q_z$, $q_z q_x$. Quadratic transformation matrix $\tilde{A} = [AQM] \in R^{3 \times 9}$ preferably minimizes the equation $\Sigma_i m_i (\tilde{A}\tilde{q}_i - p_i)^2$, and is computed by the following equation (16):

$$\tilde{A} = \left(\sum_i m_i p_i \tilde{q}_i^T\right)\left(\sum_i m_i \tilde{q}_i \tilde{q}_i^T\right) = \tilde{A}_{pq} \tilde{A}_{qq}. \quad (16)$$

A symmetric matrix $\tilde{A}_{qq} \in R^{9 \times 9}$ and vector $\tilde{q}_i$ in equation (16) can be computed before a simulation begins. Also, the control parameter $\beta$ can be used with quadratic transformation matrix $\tilde{A}$ to further control the positions of the goal points. For example, the goal points could be generated by the equation $g_i = [\beta \tilde{A} + (1-\beta) \tilde{R}]\tilde{q}_i$, where $\tilde{R} \in R^{3 \times 9} = [R00]$ instead of using equation (15).

Still another way to compute goal points $g_i$ is by dividing actual points $x_i$ into overlapping clusters and then computing a separate transformation matrix for each cluster. For example, actual points $x_i$ represented by a volumetric mesh can be divided into clusters where each cluster comprises points adjacent to a common element of the volumetric mesh (e.g. tetrahedron). Alternatively, a mesh can be regularly divided into overlapping cubical regions, and then a cluster can be formed by all points in each cubical region.

At each timestep, original points and actual points corresponding to each cluster are matched to generate goal points $g_i^c(t)$, where "i" denotes the index of each point, and "c" denotes a particular cluster. Using goal points $g_i^c(t)$ instead of goal points $g_i(t)$, equation (11) becomes the following equation (17):

$$v_i(t+h) = v_i(t) + \alpha \frac{g_i^c(t) - x_i(t)}{h} + h f_{ext\_i}(t)/m_i. \quad (17)$$

One general problem with the velocity update in equations (11) and (17) is that the behavior of the system is highly dependant on timestep "h". One way to address the problem is by setting $\alpha = h/\tau$, where $\tau \leq h$ is a time constant.

Not all points of an actual shape or original shape need to be considered when computing a transformation matrix to define the locations of goal points $g_i$. For example, where a deformable object comprises a large number of points, a subset of the actual points and corresponding original points defining the deformable object can be used to generate a transformation matrix. The transformation matrix can then be used to transform all of the original points to generate the goal points.

The method described in relation to FIG. 3 can also be used to simulate plastic deformable objects. Typically, a plastic deformable object is simulated by representing a deformation state $S^p$ for the object. The deformation state $S^p$ is initialized with the identity matrix "I" and then updated with each timestep of the simulation.

Deformation state $S^p$ is updated based on symmetric matrix S derived by the polar decomposition of second matrix $A_{pq}$ of equation (9). Symmetric matrix S represents a deformation of the original shape in an unrotated reference frame. Accordingly, where an amount of deformation (i.e., a distance) $\|S-I\|_2$ exceeds a threshold value $c_{yield}$, state matrix $S^p$ is updated according to the following equation (18):

$$S^p \leftarrow [I+hc_{creep}(S-I)]S^p. \quad (18)$$

In equation (18), timestep "h" and the parameter $c_{creep}$ are used to control the plasticity of the deformable object. The plasticity can be bound by testing whether $\|S^p-I\|_2$ exceeds a threshold value $c_{max}$. Where $\|S^p-I\|_2 > c_{max}$, state matrix is set by the following equation (19):

$$S^p \leftarrow I+c_{max}(S^p-I)/\|S^p-I\|_2. \quad (19)$$

State matrix $S^p$ is incorporated into the simulation of the deformable object by replacing the definition of $q_i = x_i^0 - x_{cm}^0$ in equation (8) with the following equation (20):

$$q_i = S^p(x_i^0 - x_{cm}^0). \quad (20)$$

To ensure that the volume of the deformable object is conserved throughout the simulation, state matrix $S^p$ is divided by $\sqrt[3]{\det(S^p)}$ every time it gets updated. Note that each time $S^p$ is updated, first and second matrices $A_{qq}$ and $A_{pq}$ must also be updated.

The foregoing preferred embodiments are teaching examples. Those of ordinary skill in the art will understand that various changes in form and details may be made to the exemplary embodiments without departing from the scope of the present invention as defined by the following claims.

What is claimed is:

1. A computer-implemented method of simulating a deformation of a deformable object, the method comprising:
    defining an original shape based on a non-deformed state of a deformable object, wherein the original shape comprises a plurality of original data points;
    defining an actual shape corresponding to a deformed state of the deformable object, wherein the actual shape comprises a plurality of actual data points;
    defining a goal shape corresponding to the non-deformed state of the deformable object such that the goal shape is a matched version of the original shape, wherein the goal shape comprises a plurality of goal data points;
    matching the original shape comprising original data points to corresponding actual data points in the actual shape by rotating and translating the original shape of the deformable object; and
    updating parameters of each actual data point according to a position of a corresponding goal data point in the goal shape by moving each of the plurality of actual data points corresponding to the deformed state toward a corresponding goal data point in the goal shape.

2. The computer-implemented method of claim 1, wherein the updated parameters of each actual data point are used to simulate the deformation of the deformable object in a graphics simulation performed on a computing device.

3. The computer-implemented method of claim 1, wherein the parameters comprise position and velocity.

4. The computer-implemented method of claim 3, wherein the step of updating parameters of each actual data point comprises:
    defining a velocity of the actual data point at a particular time based on a velocity of the actual data point at the particular time and a difference between a position of a corresponding goal point and a position of the actual data point at the particular time; and
    defining a position of the actual data point at the particular time based on a position of the actual data point at the particular time and the velocity of the actual data point at the particular time.

5. A non-transitory computer-readable medium storing instructions that, when executed by a processor, cause the processor to simulate a deformation of a deformable object, by performing the steps of:
    defining an original shape based on a non-deformed state of a deformable object, wherein the original shape comprises a plurality of original data points;
    defining an actual shape corresponding to a deformed state of the deformable object, wherein the actual shape comprises a plurality of actual data points;
    defining a goal shape corresponding to the non-deformed state of the deformable object such that the goal shape is a matched version of the original shape, wherein the goal shape comprises a plurality of goal data points;
    matching the original shape comprising original data points to corresponding actual data points in the actual shape by rotating and translating the original shape of the deformable object; and
    updating parameters of each actual data point according to a position of a corresponding goal data point in the goal shape by pulling moving each of the plurality of actual data points corresponding to the deformed state toward a corresponding goal data point in the goal shape.

6. The non-transitory computer-readable medium of claim 5, wherein the updated parameters of each actual data point are used to simulate the deformation of the deformable object in a graphics simulation performed on a computing device.

7. The non-transitory computer-readable medium of claim 5, wherein the parameters comprise position and velocity.

8. The non-transitory computer-readable medium of claim 7, wherein the step of updating parameters of each actual data point comprises:
    defining a velocity of the actual data point at a particular time based on a velocity of the actual data point at the particular time and a difference between a position of a corresponding goal point and a position of the actual data point at the particular time; and
    defining a position of the actual data point at the particular time based on a position of the actual data point at the particular time and the velocity of the actual data point at the particular time.

9. A computer system, comprising:
    a processor; and
    a memory configured to store an application including instructions that, when executed by the processor, cause the processor to simulate a deformation of a deformable object, by performing the steps of:
        defining an original shape based on a non-deformed state of a deformable object, wherein the original shape comprises a plurality of original data points;
        defining an actual shape corresponding to a deformed state of the deformable object, wherein the actual shape comprises a plurality of actual data points;
        defining a goal shape corresponding to the non-deformed state of the deformable object such that the goal shape is a matched version of the original shape, wherein the goal shape comprises a plurality of goal data points;
        matching the original shape comprising original data points to corresponding actual data points in the actual shape by rotating and translating the original shape of the deformable object; and
        updating parameters of each actual data point according to a position of a corresponding goal data point in the goal shape by moving each of the plurality of actual data points corresponding to the deformed state toward a corresponding goal data point in the goal shape.

10. The computer system of claim 9, wherein the updated parameters of each actual data point are used to simulate the deformation of the deformable object in a graphics simulation performed on a computing device.

11. The computer system of claim 9, wherein the parameters comprise position and velocity.

12. The computer system of claim 11, wherein the step of updating parameters of each actual data point comprises:
    defining a velocity of the actual data point at a particular time based on a velocity of the actual data point at the particular time and a difference between a position of a corresponding goal point and a position of the actual data point at the particular time; and
    defining a position of the actual data point at the particular time based on a position of the actual data point at the particular time and the velocity of the actual data point at the particular time.

13. The computer-implemented method of claim 1, wherein the amount of rotation and translation is determined by minimizing distance between goal data points in the goal shape and corresponding actual data points in the actual shape.

14. The computer-implemented method of claim 13, wherein the rotation and translation are chosen to minimize a weighted least square distance between corresponding data points in the goal shape and the actual shape.

15. The non-transitory computer-readable medium of claim 5, wherein the amount of rotation and translation is determined by minimizing distance between goal data points in the goal shape and corresponding actual data points in the actual shape.

16. The non-transitory computer-readable medium of claim 15, wherein the rotation and translation are chosen to minimize a weighted least square distance between corresponding data points in the goal shape and the actual shape.

17. The computer system of claim 9, wherein the amount of rotation and translation is determined by minimizing distance between goal data points in the goal shape and corresponding actual data points in the actual shape.

18. The computer system of claim 17, wherein the rotation and translation are chosen to minimize a weighted least square distance between corresponding data points in the goal shape and the actual shape.

* * * * *

UNITED STATES PATENT AND TRADEMARK OFFICE
CERTIFICATE OF CORRECTION

| | | |
|---|---|---|
| PATENT NO. | : 8,886,501 B2 | Page 1 of 1 |
| APPLICATION NO. | : 13/471361 | |
| DATED | : November 11, 2014 | |
| INVENTOR(S) | : Müller-Fischer et al. | |

It is certified that error appears in the above-identified patent and that said Letters Patent is hereby corrected as shown below:

Claims:

Column 12, Claim 5, Line 22, please delete "pulling".

Signed and Sealed this
Twenty-first Day of April, 2015

Michelle K. Lee
*Director of the United States Patent and Trademark Office*